Oct. 22, 1940.  F. BARBER  2,218,840
VARIABLE SPEED AND MOTION TRANSMITTING MECHANISM
Filed Dec. 30, 1939  4 Sheets-Sheet 3

Patented Oct. 22, 1940

2,218,840

UNITED STATES PATENT OFFICE 2,218,840

VARIABLE SPEED AND MOTION TRANSMITTING MECHANISM

Frank Barber, Toronto, Ontario, Canada

Application December 30, 1939, Serial No. 311,740
In Great Britain January 3, 1939

22 Claims. (Cl. 74—117)

The invention relates to the mechanical transmission of power at variable speed-ratios between a driving and a driven shaft and it is an important object of the invention to provide a mechanism which will be easily controlled either at will or automatically to transmit power positively from the driving shaft to the driven shaft at any desired ratio from zero to a maximum in which the speed of the driven shaft may be any desired number of times that of the driving shaft and which will operate in reverse without extra moving parts and in which the relative motion of parts always will be small and at direct drive will be zero and in which the pulsations of the back and forth movements which result from the employment of intermittent clutch devices balance each other without resulting vibration.

A further and very important object is to provide a mechanism which has uniformity of output speed for any certain speed-ratio which may be chosen; that is, in which the velocity of the driven shaft relative to that of the driving shaft throughout each revolution is, for all practical purposes, uniform. (For the purpose of the following description the velocity of the driving shaft is assumed to be uniform. Where the word uniformity is used without qualification it is to be understood to mean uniformity of velocity relative to that of the driving shaft.)

The principal features of the invention reside in the novel construction, motional relation and relativity of parts whereby most of the motion is carried directly as rotation from the driving to the driven shaft and secondly, whereby the mechanism is operated (by varying the speed-ratio) by means of the intermediate translation of a small part only of the rotary motion of the driving shaft, after due modification of said rotary motion (without changing the average speed) into uniform straight line motion on radially oscillating members arranged so that their pulsations balance each other, the said members being carried on a rotatable frame operatively connected with the driving shaft which imparts a rotary motion to said oscillating members in addition to their radial motion and which in conjunction with an orbital mechanism operatively connecting driving and driven shafts affords a complete range of speed-ratios, reduces the radial speed of said oscillating members and as the speed-ratio is increased reduces, and at direct drive eliminates, the relative motion of all other power-transmitting members, the combination being such that the motion, both linear and angular of the said oscillating members imparts, without vibration, in conjunction with consecutively acting intermittent clutch devices, uniform movement to the driven shaft.

In the drawings,

Figure 4ᵃ is a vertical section taken centrally through the mechanism illustrated in Figure 4.

Figure 4ᵇ is a part sectional elevational detail of a modified form of control device.

Fig. 5ᵃ is a part horizontal section and elevation of the mechanism illustrated in Figure 5.

Figure 5ᵇ is an elevational view taken from the right side of the mechanism illustrated in Figure 5.

Figure 6ᵃ is an elevation from the left of the mechanism illustrated in Figure 6.

Figure 6ᵇ is an elevational view taken from the bottom of the mechanism illustrated in Figure 6.

Figure 6ᶜ is an elevation and part section of the mechanism illustrated in Figure 6 taken from the right side.

The present invention effectively overcomes objectionable features found in many proposed forms of power transmission mechanism in which intermittent clutch devices operated by the driving shaft were utilized to propel the driven shaft at a selected speed-ratio. Careful analysis of these known structures shows that they did not provide means which would maintain uniformity of motion of the clutch members throughout their entire stroke and they imparted an uneven and jerky motion to the driven shaft resulting in a movement of this shaft in a pulsating manner alternately fast and slow during each revolution thereof, causing considerable vibration and strain on the operating parts and the machines or vehicles to which power was transmitted.

Further, the rapidity with which the clutch elements and associated parts were required to operate, not only increased the said tendency to vibration, but resulted in considerable friction and wear between the parts, causing rapid depreciation.

Also, due to the non-uniformity of motion, the scope of usefulness of the known mechanisms is greatly restricted since they cannot be employed where extreme accuracy and uniformity between input and output motions are essential, one example of this being as a speed change device for lathes for screw cutting or feed purposes.

In my Patent No. 2,144,609, there is disclosed a variable speed mechanism which overcomes the above difficulties associated with earlier structures and the present invention, while adhering substantially to the underlying principles set forth in the said patent, provides improved structural combinations which simplify and enhance the practicability of a mechanism of this type and render the device more compact.

Figure 1:
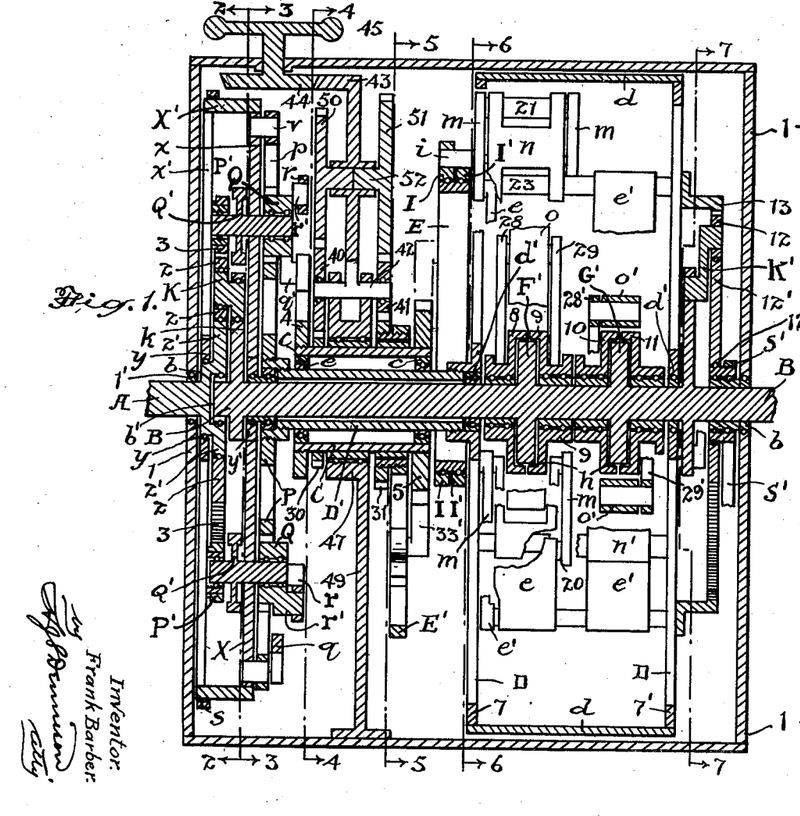
Figure 1 is a mid-sectional elevational view of a variable-ratio power-transmitting mechanism constructed in accordance with the present invention.

In the form of the invention illustrated herein the driving shaft A, Figure 1, is supported and journalled in the casing 1 by bearing 1', and has formed thereon, just inside the casing, an eccentric 2' on the periphery of which is rotatably mounted toothed gear ring 2. The driven or output shaft B, co-axial with A, is journalled at one end in a bearing b arranged in a recess b' in the eccentric end of the shaft A and at the other end in a bearing b at the opposite side of said casing. The shaft B thus extends almost from end to end of the casing and provides bearing supports for all or most of the other revolving elements.

A frame structure D comprising spaced circular end sections 7 and 7', rigidly connected by the peripheral cylinder d, is rotatably mounted in bearings d' on the shaft B and is capable of axial rotation relative to and concentric with the shaft B. The end section 7 carries a tubular shaft extension D' concentric with and journalled upon the output shaft B and a cog-wheel P is mounted on the end thereof remote from the section 7, said cog-wheel forming part of the modifying mechanism described hereinafter. A short sleeve shaft C concentrically encircles the tubular shaft D' and is supported in bearings c upon it.

Another frame structure X comprising circular end sections x, x' rigidly connected by a short peripheral cylinder X' is rotatably mounted on bearings y mounted on the shaft A and on y' on the shaft B for axial rotation relative to and concentric with B. An internally toothed gear ring 3 is rigidly supported within the frame X concentric with the axis of said frame and the teeth of said ring intermesh with the external teeth of the eccentrically journalled and smaller gear ring 2 which is arranged within the outer ring 3. As the shaft A and the eccentric 2' are rotated, the gear ring 2 is revolved in a circular orbit about the driving shaft A; i. e. the axis of the pinion 2 is revolved about the axis of the driving shaft A and with the velocity of A, and pinion 2 also axially rotates with the velocity of the output shaft B, since 2 and B are connected by a triple arrangement of cranked coupling links K journalled in bearings in the arms k which are rigidly secured to the shaft B.

Thus the power is transmitted from driving shaft A, through gears 2 and 3 to frame X, the rotational speed of X being modified by the speed of the output shaft B. And when, for instance, the speed-ratio of driven shaft B to driving shaft A is zero, i. e. when B does not rotate, the velocity of X is one-tenth that of A, (when the pitch diameter of the gear 2 is nine-tenths that of the gear 3 as here illustrated); and again, when the speed ratio is adjusted for direct drive, A, B, 2, 3 and X all rotate together without relative motion. As the output speed increases beyond direct drive the speed of pinion 2 increases slightly more than that of gear 3 but can never exceed a speed of one-ninth greater. The gear wheels 2 and 3 are hereinafter designated the "orbital" mechanism.

Figure 7:
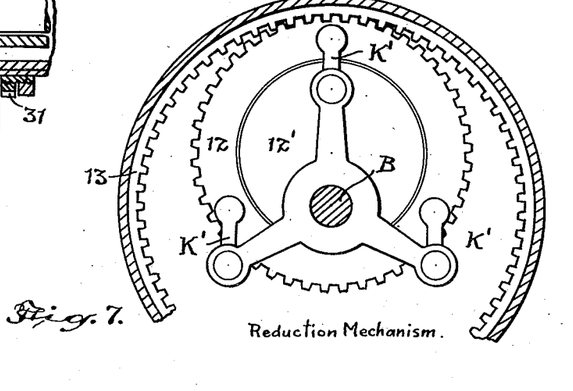
Figure 7 is an elevational detail of the internal and external gear rings of the reduction mechanism as viewed from the line 7—7 of Figure 1.

A "reduction" mechanism is here shown in the form of an internally toothed gear ring 13 rigidly mounted on the frame D and an externally toothed gear ring 12 rotatably supported on a stationary eccentric bearing 12' encircling the driven shaft B. This "reduction" mechanism is adapted to rotate frame D at a speed directly proportional to the output speed, and its functions, including reduction of oscillations, are described hereinafter.

Figures 2, 4A:
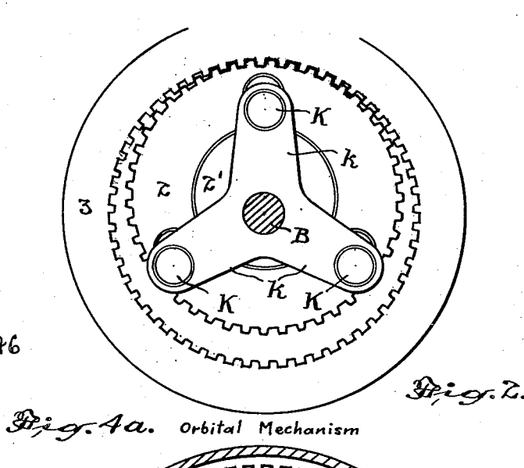
Figure 2 is an elevational detail of the internal and external meshing gear rings of the orbital mechanism taken on the line 2—2 of Figure 1.

These "orbital" and "reduction" mechanisms are similar in the arrangement of the gear wheels although entirely different in function. The pinions of both mechanisms are rotated by and with the velocity of the output shaft B, by means of the similar cranked triple-link couplings K, K, K in the orbital mechanism and K', K', K' in the reduction mechanism. But in the former, (Figure 2), the eccentric bearing 2' of the pinion rotates and in the latter, (Figure 7), the corresponding eccentric 12' is stationary, the link-supporting arms k', k', k' being rigid with the driven shaft B as in the case of the arms k, k, k of the "orbital" mechanism previously defined.

While I have shown and described a preferred arrangement of the gear wheels in the "orbital" and "reduction" mechanisms, I may modify the same within the essential spirit of the invention such as, for example, by rigidly mounting the internal gear ring in each case on the driven shaft and in either case, I may resort to the use of toothed gear wheel connections in place of the said cranked coupling links so that the resulting three wheels in each mechanism will all rotate in the same sense with the eccentrically mounted wheel meshing externally with the larger wheel and internally with the smaller.

Figure 3:
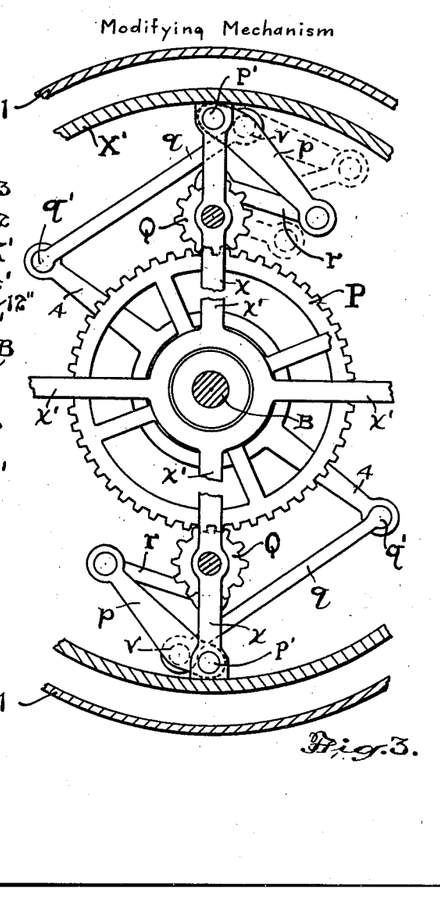
Figure 3 is an elevational and part sectional detail of the modifying mechanism taken on the line 3—3 of Figure 1.

The power is transmitted from frame X to drive arms 4 on the sleeve shaft C, (see Figure 3) spaced a suitable distance from frame X, through links p and q pivotally connected at v, (see Figures 1 and 3). The "modifying" mechanism is located between frame X and arms 4, the purpose of which will be explained hereinafter, and the effect of which is a slight and continuously varying difference in the rotational speeds of the frame X and the sleeve shaft C, the latter being alternately slightly faster and slower than the former while their average speeds are maintained equal.

The sleeve C has mounted thereon, in addition to the said arms 4, an arm 5 and pivotally connected to the outer end e of said arm 5 is an arm 6 which extends inwardly towards the shaft B and is rigidly connected to a ring E (Figures 1 and 5) which encircles with variable eccentricity the shaft B. The speed-ratio varies with the eccentricity of the ring E, as will hereinafter appear, and while any suitable means may be provided for adjusting E while in motion from a position concentric with shaft B to any eccentric relation with B so as to produce any desired speed-ratio, I have shown a particularly suitable means for this purpose in the "speed-ratio control mechanism" (shown in Figures 4 and 4a) situated between the arms 4 and 5 on sleeve shaft C (see Figure 1), and also an alternative control mechanism (in Figure 4b), both of which are described hereinafter. A ring E' of similarly varying eccentricity and with similar pivotal connections 5' and 6' with sleeve C serves as a counterbalance to ring E and also to the ovals in frame D hereinafter described.

Figures 6, 6A, 6B, 6C:
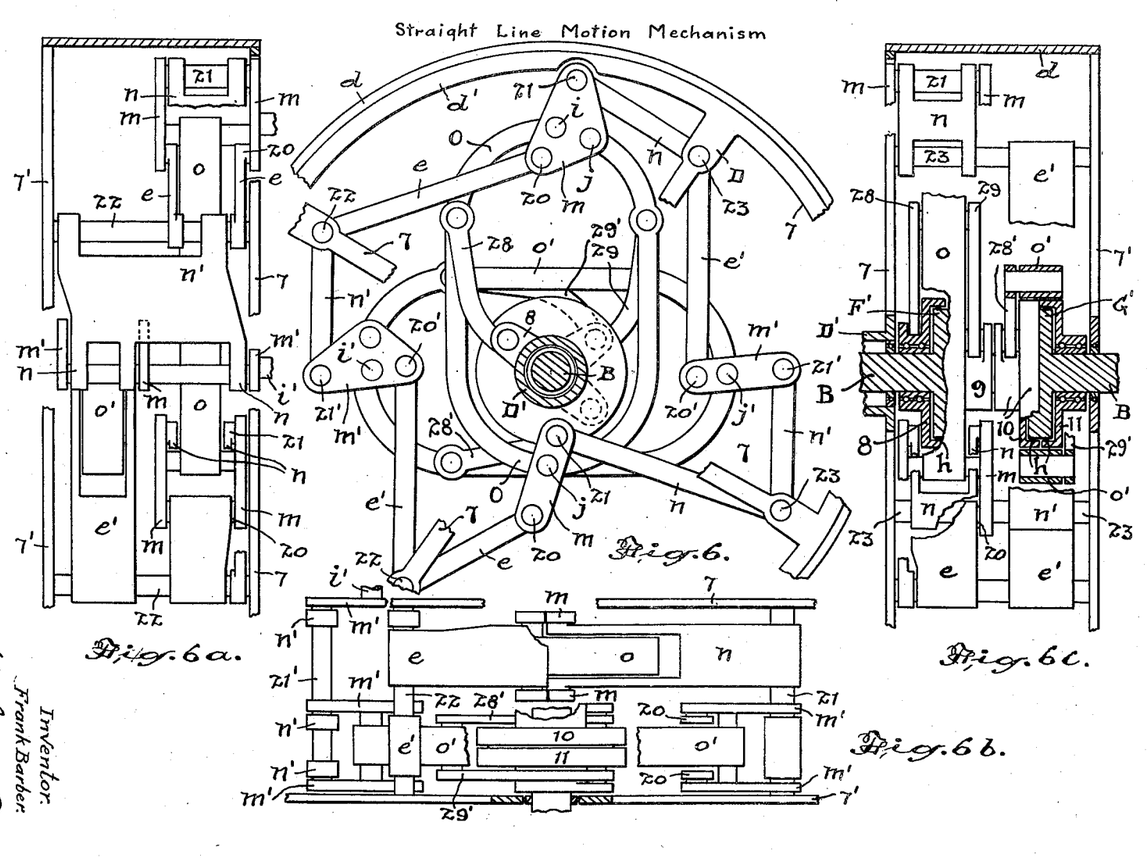
Figure 6 is an elevational detail of the straight line movement mechanism as viewed from the line 6—6 of Figure 1.

Adjoining the eccentric ring E is the said rotating frame D within which are the floating oval rings 0 and 0' hung from the quadruple spokes of the end sections 7 and 7' of D, (see Figure 6). Two ovals are found to be sufficient and, as each is double acting, this requires one phase of speed modification in each quadrant that the eccentric E gains over the rotatable frame D, as explained hereinafter. The ovals oscillate in straight radial paths equally inclined to each other and thus where two ovals are employed their paths are perpendicular.

Whilst within the spirit of this invention the ovals may be guided in straight paths by any convenient means, e. g. by sliding cross-heads, I have shown a particularly suitable means, now to be described.

Each end of floating ring 0 is pivoted at $j$ to the middle link $m$ in a chain of three links $l, m, n$ pivoted together at 20 and 21 and with the outer ends pivoted at 22, 23 to the spokes of the end sections of D. Each triple-link chain is so formed and arranged that the pivot $j$ on each middle link is movable back and forth in a straight line in accordance with Watt's "straight line mechanism," the said pivots $j$, at either end of 0 moving in parallel lines, so that the oval 0 itself is constrained to movement in a straight path. The other oval 0' is supported and guided by similar link chains $l'$, $m'$, $n'$ so disposed that the paths of ovals 0 and 0' are perpendicular to each other.

The upper one of the middle links $m$, which pivotally connects with 0 at $j$, is triangular and is also pivotally connected by $i$ to a strap ring I, which encircles eccentric E, (Figure 5), as described below. The line through the said pivots $i, j$ is perpendicular to the line through 20, 21 and since $j$ moves in a straight line, $i$ also moves in a line which is straight for all practical purposes and it is placed so that its path is radial to the axis of shaft B. Similarly the pivot $i'$ on the oval 0' is attached to strap ring I' and moves in a radial path perpendicular to the path of $i$ on oval 0.

Superimposed on this straight line movement of the ovals (as referred to the frame D) is a much faster one of rotation; frame D and with it the ovals and their radial paths are made to rotate at a rate nearly the same as that of shaft B. In the design here illustrated frame D rotates at four-fifths the speed of the output shaft B. The rotation of D is effected by any suitable mechanism connected with the output shaft; that shown in Figures 1 and 7 and designated as the "reduction mechanism" is a simple arrangement of internal and external gear wheels 13 and 12 suitable for this purpose.

The power is transmitted from eccentric ring E, (Figure 5) to rotating frame D as follows. Twin straps I and I' side by side encircle E concentrically and are axially rotatable on separate bearings on E. Strap ring I is connected by pivot $i$ to the respective middle link $m$ (Figure 6) which guides oval 0 as mentioned above, and strap ring I' is connected by pivot $i'$ to the respective middle link $m'$ guiding the other floating oval 0'. Straps I and I', therefore, make the same number of axial rotations as frame D, and since adjustable ring E and frame D are not in general concentric, and since the centre G of eccentric E orbitally revolves about the axis of frame D at a different rate to the axial rotation of frame D, radial movements back and forth are produced in the ovals 0 and 0'. In other words, centre G, being a fixed distance from pivot $i$ or $i'$, as the centre G revolves about the axis of frame D relative to and faster than D, it causes reciprocating back and forth movements of pivots $i$ and $i'$ in intersecting paths, so that each pivot is displaced in a manner similar to the movements of the cross head pivot on a connecting rod (between the crank and the piston rod) of a reciprocating engine and in further comparison it may be said that the crank is represented herein by the eccentric E, and the length of the connecting rod centre to centre of pivots is the distance between centre G and pivot $i$ or $i'$.

Clutch hubs F' and G' (see Figures 1 and 6) are fixed to the driven or output shaft B between the ends 7 and 7' of frame D and paired clutch rings 8 and 9 are arranged in concentrically spaced relation at the respective sides of hub F' and clutch rings 10 and 11 are similarly placed at the sides of hub G'. These four clutch rings are rotatable on suitable bearings on the shaft B. A flange on each of the clutch rings 8 and 9 concentrically encircles the outer periphery of the hub F' and similar flanges on 10 and 11 encircle the hub G'. All of the clutch rings are here shown as having clutch balls $h$ or the like of the type commonly used in free wheel clutches, disposed to form a clutching contact between each ring and its corresponding hub when the ring and the hub are relatively moved in one direction, and to permit free rotation of the clutch rings relative to the hubs when the rings and hubs are relatively moved in the opposite direction.

Links 28 and 29 pivotally connect the oval 0 to arms on the clutch rings 8 and 9 respectively and similar links 28' and 29' connect oval 0' to arms on rings 10 and 11. The back and forth movements of the ovals generate, by means of the said connecting rods, back and forth rotary movements in the said clutch rings—in rings 8 and 9 by 0 and in 10 and 11 by 0'—each oval being double acting.

The movements of the said clutch rings are "back and forth" only as referred to frame D, since the radial paths of the ovals themselves rotate continuously forward, the said clutch rings always rotate forward but at faster and slower rates. The successive faster movements of the rings are synchronous with consecutive quadrants in the orbital revolution of the centre G of eccentric ring E relative to D. and, controlled by the said one-way ball clutches, they cause continuous uniform rotation of the output shaft B.

Figure 4:
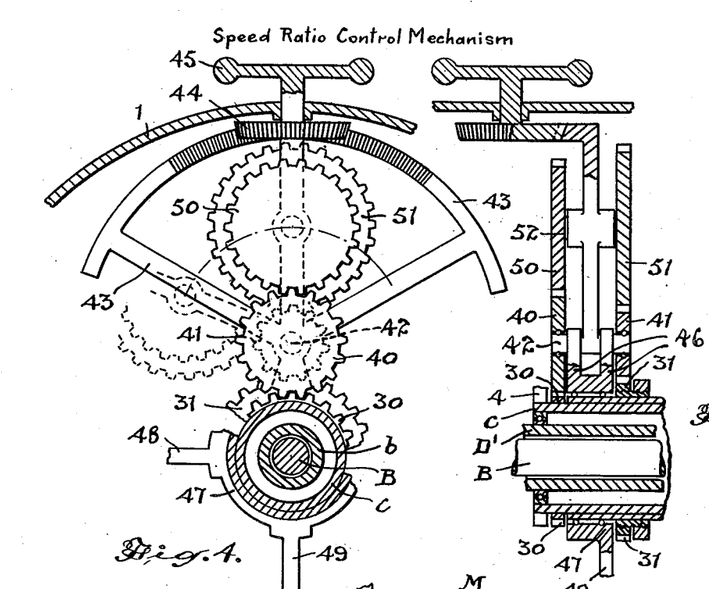
Figure 4 is an elevational and part sectional view of the control mechanism taken on the line 4—4 of Figure 1.
Figure 4B:
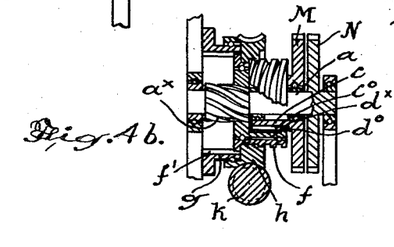

*Speed control mechanism.*—The speed-ratio increases as the length of stroke of pivots $i$ and $i'$ increases and the said length of stroke varies directly with the eccentricity of the ring E. The speed-ratio therefore can be controlled by varying this eccentricity and a particularly suitable means for effecting this variation herein called the "speed control mechanism" is shown in Figures 1 and 4 particularly.

This control mechanism comprises two triple-wheel trains of spur wheels arranged side by side in three co-axial pairs 30—31, 40—41, 50—51. The terminal wheels of each train are equal in diameter, i. e. 30 and 50 are equal and 31 and 51 are equal, but 31 and 51 are larger than 30 and 50. The first pair 30—31 is co-axial with sleeve C, 30 being fixed to said sleeve and 31 rotatably mounted on it. The middle pair 40 and 41 are rotatably mounted on the fixed axis 42 of a quadrant 43. The third pair 50 and 51 are joined so as to rotate together on their movable axis 52 journalled in the middle spoke of the quadrant 43. The quadrant can rotate axially about pivot 42 approximately 170° causing the end pair 50 and 51 to revolve orbitally with it. This partial rotation back or forth of 43 is here shown effected by a spur wheel 44 which meshes with 43. The spur wheel 44 is journalled in the casing I and has concentrically fixed upon it outside the casing a handwheel 45 by which it can be rotated. The axis 42 of the middle pair of gears is journalled in a forked extension 46 (see Figure 4a) of the element 47 which encircles the sleeve C and may be utilized as a supporting bearing therefor. This element 47 is fixed to the casing I in any suitable manner as by radial arms 48 and 49.

Fixed to the hub of the gear wheel 31 is arm 32, (Figure 5), which is pivotally connected by a link 33 to the eccentric ring E to determine the eccentricity thereof. For any selected speed-ratio, the gears 30 and 31 and ring E all rotate together with the sleeve C, but as described below the gear 31 and its arm 32 can be rotated relatively to the gear 30, and the ring E can thus be moved from a position concentric with sleeve C to its position of maximum eccentricity by a relative rotation of wheel 31 of about 50°. The said relative rotation is effected in the following manner by turning hand wheel 45.

Since the terminal wheels in each triple train are equal and since the end pair, 50, 51 comprising one terminal wheel of each train are fixed together, all four terminal wheels axially rotate with the velocity of sleeve C to which one of them 30, is fixed, but only so long as none of the three axes move relatively. But when the quadrant 43 is axially rotated it carries with it the axis of the pair 50, 51 and this orbital revolution of the latter pair causes relative axial rotation between 30 and 31 and the said relative axial rotation varies directly with the said orbital revolution.

The immediate purpose of the "speed control mechanism" is to effect relative angular movement at will or automatically between two co-axial rotating elements while they are in motion by independent movement of a control member, and while I have shown and described a suitable form of mechanism for accomplishing this purpose in an efficient manner, other forms of control mechanism may be resorted to including a suitable adaptation of the gear mechanism illustrated in Figure 7.

Referring to the specific modification of the "Speed control means" shown in Figure 4b, gear wheels 30 and 31 (Figure 4) are mounted as described above but are made the same size to mesh with gear wheels M and N (Figure 4b) which are concentric with and fixed to shafts $c$ and $a$ respectively. The rotating sleeve shaft $d^x$ is prevented from rotating relatively to shaft $c$ by key and slot $d^0$ and $c^0$ but it can move axially by sliding along and over $c$. Secondly, the threaded cylinder $f$, can be moved by turning its encircling nut $h$ by a work $k$ engaging external teeth on $h$, but is prevented from rotating by key and slot $f'$. As the non-rotating cylinder $f$ is moved to the right or left it carries with it the rotatable shaft $d^x$ since the one is journalled in the other. Thirdly, the shaft $a$ which is formed with a spiral thread $a^x$ and the end section of $d^x$ engage as screw and nut and (the angle of pitch being less than the angle of friction) when $f$ is moved to right or left by operating nut $h$, member $a$ is screwed further into or out of $d^x$, thus causing the required relative axial rotation between them and through the pairs of gears M (Figure 4b) and 30 (Figure 4), and N (Figure 4b) and 31 (Figure 4), the required relative rotation is effected between 30 and 31 (Figure 4) by which the eccentricity of E is varied.

Alternatively this control mechanism may be mounted co-axially on shaft C which is then spirally threaded, taking the place of shaft $a$ in Figure 4b, and shaft $c$ (which is rotated relatively to shaft C by this mechanism) has fixed to it the strap for the arms 32 and 32'. This alternative eliminates the four gear wheels M, N, 30 and 31, but the elements are larger than in the mechanism as shown in Figure 4b.

The method and means for obtaining relative uniformity of angular velocity between the driving and driven shafts will now be described.

The general requirement in positive-acting variable-speed transmission is that uniform angular motion by way of a point or points moving completely about a circle of variable radius be translated as nearly as possible into uniform motion throughout each operative range of a number of reciprocating points with successive operative ranges oscillating on the arcs of a circle or circles of fixed radius.

It has been mathematically proven that this cannot be effected with mathematical exactitude by circular spur wheel trains or by link chains with outer ends moving in straight beds or on circular arcs or by a combination of these; this would be equivalent to "squaring the circle" by Euclidean methods. It is true that it can be accomplished with precision (at least theoretically) by actually "developing" the circle of variable radius, e. g. by belts or other friction devices, but a circle of variable radius probably cannot be "developed" within the compass of positive action.

However, I have extensively investigated this problem and find that it can be resolved practically with "positive" action to any required degree of accuracy by the following method, which is an important underlying principle of the present invention.

Uniform angular motion is first duly modified from uniformity and, by way of a point moving with the said modified motion about a circle of variable radius is then intermediately translated into uniform linear motion of reciprocating points oscillating on straight lines, and thence into uniform angular motion of reciprocating points oscillating on circular arcs of fixed radius. More particularly described, uniform rotary motion in the frame X is modified in character from uniformity by the "modifying mechanism" during its transmission through links $p$ and $q$ to the sleeve shaft C, and thus to the centre G of the eccentric ring E revolving on an orbit of variable radius about the axis of, and with the modified motion of, the shaft C. The motion of centre G, by means of its encircling ring E, is intermediately translated into oscillations of the ovals O and O' in radial straight paths, the alternate operative ranges of which have uniform lineal motion. The mutually perpendicular chords of the successive quadrants of centre C correspond to the mutually perpendicular successive paths of the ovals O and O'. This may be designated the "direct movement." The translation from this radial motion to the oscillations of the clutch rings 8 to 11 with alternate operative ranges of uniform angular motion and thence by means of the one-way ball clutches h to uniform rotation of the output shaft B, may be designated the "return movement."

I shall first describe the said "return movement" assuming (what will be shown hereinafter) that the straight line movement in each operative range is uniform. The operation of the elements which produce the said movement from straight line motion in the ovals to angular motion has been described; the underlying principles of design, in accordance with which relative uniformity in this movement is accomplished by means of a novel "straight line movement" will now be described.

First it can be seen that straight line motion can be translated into relatively uniform angular motion of points moving on the arcs of a circle of fixed radius by "developing" the circle, notably in the well-known rack and pinion device, since a rack moving uniformly in a straight path will produce uniform axial rotation in a pinion meshing with it. This device could be adapted for use in the said return movement as alternative to that here shown by providing the ovals each with two racks on opposite sides of the shaft B, each of which racks would mesh with a pinion encircling one of the clutch rings 8 to 11. But the arrangement shown here is simpler mechanically.

Figures 5, 5A, 5B, 8, 9, 10, 11:
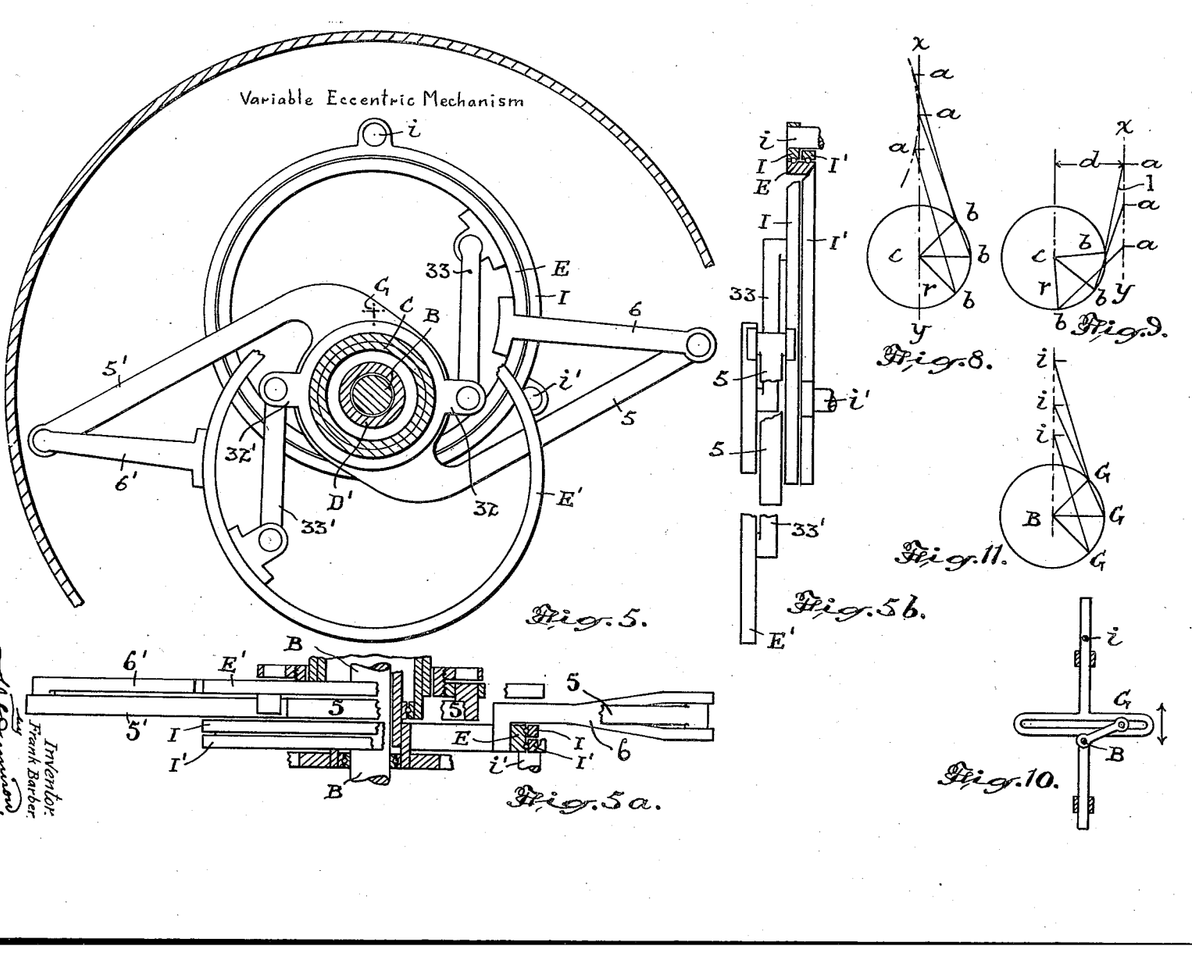
Figure 5 is an elevational and part sectional detail view of the mechanism as viewed from the line 5—5 of Figure 1.
Figures 8, 9, 10 and 11 are diagrams illustrating the principle of straight line motion translation as hereinafter defined.

In Figure 8, I have indicated diagrammatically an example of a construction such as is commonly employed in variable-speed transmissions showing the wide divergence from uniformity of motion of the connected points $a$ and $b$, for an operative range of a quadrant or even considerably less, the point $a$ being caused to travel either on the straight line $x$—$y$ passing through the centre of the circle or, on a curved line substantially tangent therewith. I propose to overcome this objectionable error or divergence from uniformity by introducing a mechanism with the same number of elements as in Figure 8 and of similar parts and of equally simple construction by merely adding a calculated extra space relation as diagrammatically illustrated in Figure 9, in which the straight path $x$—$y$ is spaced a predetermined distance from the centre $c$. By the control afforded by this extra parameter or controllable factor in the velocity equation I am able to reduce this divergence from uniformity of the movements of points $a$ and $b$ to a practically negligible amount for about four-thirds of a quadrant of the revolution of $b$. Here the speed-ratio of $a$ and $b$ has been made equal at three points, namely at or near the mid-position and near each end instead of at only one point as shown in Figure 8. Referring to Figure 9, I have found by computation that for uniform results the perpendicular distance $d$ from centre $c$ to line $x$—$y$ may be 1.345 times the radius $r$ and that the length of the connecting link $l$ should then be 1.749 times the radius $r$ but other suitable ratios may be found within the spirit of the present invention. The fact that the elements producing this "return movement" are all moving in the same direction by a rotational motion superimposed upon the movements described above does not affect the character or accuracy of these results. Uniformity of velocity between the reciprocating points distinguishes this movement from other known "straight line motions."

In the "direct movement," the centre G of the eccentric E which may be said to be the point moving on a circle of variable radius—and pivot $i$, one of the points moving on a straight line, may be diagrammatically represented as in Figure 10, which is for the purpose of illustration only. Here G is a point or pivot moving in a circular path about its centre B, and also sliding in the cross-slot shown. G carries the element with the slot in the direction $i$B, perpendicular to the direction of the slot. Then if the pivot $i$ has uniform velocity so also has the resolved part of the motion of G in the direction $i$B—viz. the motion of the perpendicular projection or shadow of G on $i$B. If the operative part of the movement of G is a quadrant which extends equally above and below B, then the angular motion of G must be more rapid at the beginning and end of the quadrant relative to its motion at its mid-point in order that the motion of the reciprocating point $i$ shall be uniform. Conversely, if the angular motion of G be quickened and retarded in a predetermined manner and amount at each point of its operative quadrant it will produce uniform linear velocity in pivot $i$ independent of the radius of G. The effect of increasing the radius of G is merely to cause a wider movement of $i$ in its path. Thus Figure 10 shows graphically the nature of the required modification from uniformity of a point moving on a circle of variable radius in order to produce uniform velocity in a reciprocating point moving on a straight line.

The operation of the "modifying mechanism" illustrated in Figure 3, which effects the said required modification will now be described. It is employed in duplicate so that the centre of gravity of the said mechanism is at the axis of the shaft B and so does not revolve eccentrically. The mechanism comprises a gear wheel P and pinions Q which carry cranks $r'$ connected through the links $r$ to oscillate the toggle joints formed by the pivoted links $p$ and $q$ which connect frame X and arm 4 connected to sleeve shaft C between which the mechanism is located (see Figure 3). Thus every axial rotation of Q moves the connecting pivot $v$ between links $p$ and $q$ back and forth. The effect of this oscillation is to bring the end pivots $p'$ and $q'$ of links $p$ and $q$, one on frame X and the other on arm 4, alternately closer and farther apart thus modifying the motion of the sleeve C relative to that of X. Gear P is concentric with and fixed to the tubular shaft extension D' of frame D and pinions Q rotate axially upon pins fixed to spokes of the frame X. The axes of the pinions Q thus revolve in a circular orbit about the axis of P, the ratio of their diameters being four to one. Whilst the pinions Q revolve orbitally one quadrant they rotate axially one revolution (relative to frame D) and sleeve C is impelled through one range of speed modification. Also, as hereinbefore described, the successive operative ranges of the ovals O and O' and their corresponding clutch rings are synchronous with successive quadrants of the revolution of the centre G of the eccentric E and consequently of the sleeve C (relative to D). This explains the timing arrangement required to modify the motion of G similarly in every operative quadrant.

The pulsation due to the non-uniformity of motion of shaft C and its connections react against balance-wheels of suitable weight—in one direction against the cylindrical ring X' and in the other direction against the twin wheels Q' mounted on the extended axes of the pinions Q.

The character of the said modified motion of centre G as briefly explained above will now be described more particularly. Reverting to the diagrammatic representation of G and $i$ shown in Figure 10, uniform speed in $i$ throughout a quadrant of the reciprocating point G extending 45° above and below the mid-point opposite B requires that the speed of G should vary continuously and in a definite manner throughout the quadrant, attaining maximum speed at 45° above and below its position of minimum speed which is at the mid-point. In particular, its positions of average speed are at points of maximum deviation from normal, approximately 1° 54', which careful analysis shows are at points approximately 27° 41'.9 on each side of the mid-point. Adverting to Figure 3, the pivot $q'$ on the link $q$ moves with centre G (shown in Figure 5 and diagrammatically represented in Figure 10) and therefore it is required that the speed of $q'$ should correspond, point by point, with the speed of G as described above. The pivot $q'$ attains its average speed when it is equal to that of $p'$, i. e. when $q'$ and $p'$ are closest and farthest apart, and therefore these positions must obtain when the uniformly moving $p'$ is at the angles mentioned above, 27° 41'.9 on each side of the mid-point of each operative quadrant. It follows that these pivots must be pushed apart in about six-tenths (approximately .624—) of the time in which they are brought together again.

The required modification of motion from frame X to sleeve C may be effected by any suitable means. Whitworth's "quick-return" mechanism suggests itself; but, although correct intervals for approach and retreat of the said pivots may be effected by this means, in the velocity equations there are too few parameters (representing elements of controllable length) in this mechanism in its simple and usual design to afford sufficient control over the required timing throughout. The form described above and shown in Figure 3 is particularly suitable and gives extremely accurate results. The two said pivots $q'$ can be brought to their exact required positions relative to the corresponding uniformly moving pivots $p'$ at four positions in the revolution of pinions Q, viz. at the positions corresponding to the angular positions above-mentioned and midway between them. The maximum departure of a pivot $q'$ from its computed exact position is approximately two minutes of arc. This requires that each pivot be in a position predetermined by computation in each element of this mechanism, but according to any desired scale.

It is to be noticed that the power is substantially directly transmitted from pivot $p'$ to pivot $q'$ clear of the operating elements of this modifying mechanism (the oscillations of the said toggle joints merely reacting alternately in opposite senses on the said balance-wheels) and that consequently there is only slight pressure between the gears and other parts of this mechanism and comparatively light gear wheels P and Q are therefore sufficient.

The transference of power from the eccentric ring E to ovals O and O' through pivots $i$ and $i'$ respectively by an eccentric crank movement similar to that of the ordinary reciprocating engine has already been described. However, the motion of the said projection of centre G of eccentric E which has been carefully modified to uniformity in each quadrant cannot be transferred unaltered to the said pivots in the design shown in Figures 5 and 6 because of the varying obliquity of G$i$ or G$i'$ to the direction of motion of the radially moving pivot $i$ or $i'$. If each oval were replaced by an element with a slot as shown in Figure 10 and if a pivot could be conveniently placed at G, the centre of ring E, to operate a cross-head moving in the slot, then relative uniformity of motion between pivot $i$ and the projection of G on the line of motion of $i$ would immediately result, since the distance between them in the direction of motion of $i$ is constant, namely the perpendicular distance between $i$ and the slot. But in the design adopted in Figures 5 and 6 which is simpler mechanically the said distance is not constant but varies as the cosine of angle B.$i$.G. A single cross-head at G cannot be employed on account of the central output shaft, but a modification of the slot device could be used. Two slots placed a suitable distance on each side of the centre of each oval (either in line or parallel) would not interfere with the output shaft and would operate correctly. In the adopted design the said variation of obliquity is adequately balanced as will now be described.

It can be seen from inspection of Figure 11 (assuming uniformity in the said resolved part of the velocity of G) that the velocity of $i$ is gradually reduced from beginning to end of one of the operative quadrants of O, and is gradually increased throughout the opposite quadrant (the chords of these quadrants being parallel to the motion of $i$) and further, that such variation is increased with an increase in the radius of G which increases the said obliquity and the variations in the same.

Now consider the pair of pivots $i$ and $j$ (Figure 6) moving in nearly parallel paths on the middle link $m$ of the triple-link supporting chain of the oval O. Assuming that $j$ moves uniformly, then $i$, in its motion towards shaft B, in the beginning moves more rapidly than $j$ and at the end more slowly; and in its opposite range, moving away from B, it gradually increases its speed throughout the range; and further, this variation is increased with an increase in the radius of G, because it varies with the length of these radial paths, which vary with the eccentricity or "throw" of the eccentric ring E.

The relative motions between $i$ and the said projection of G, Figure 11, and also between $i$ and $j$, Figure 6, are therefore similar and, in the equations governing the motions of $i$ and $j$, the various controllable factors—the lengths and locations of the links and pivots of the said triple-link chain—can be adjusted in accordance with computation so that the velocity of $j$ will be almost exactly equal at every moment to the velocity of the said projection or resolved part of G in the same direction, in all respects as if the motion were transferred directly from G to $j$ or $j'$ as if through sliding contact with the slot above mentioned, as illustrated in Figure 10; in other words, G always lies opposite to the centre of O—on a perpendicular through O to its radial path—and at the point where is intersects the similar perpendicular to O'.

The effect of the "direct" and the "return" movements, described above—to transmit angular motion from the shaft A to relatively uniform angular motion in the shaft B—equally applies to any speed-ratio, i. e. to any radius of G. The fact that it is independent of the radius depends upon the fact that a straight line (to which the angular motion is intermediately translated) bears the same relation to every curvature; and it is the only line of which this is true.

It may be added that computations of the aberrations in the entire transmission system, aggregated and considered as a deviation of one of the ovals from its calculated required position for uniformity (with elements of the size and form here illustrated) shows that such maximum departure from mathematical exactitude will not exceed approximately .003 inch relative to a size of 12 inches diameter of casing, which is less than the deformation or change in length in each of several of the elements of this mechanism, constructed in steel, under a safe load.

The weights of the ovals and their connecting links are adjusted so that the weight of each oval system is the same and so that the centre of gravity of each is at the centre of the oval, and therefore the centre of shaft B and the three centres of gravity of ring E and of the two oval systems are located at the angular points of the rectangle formed by the said perpendiculars and the radial lines through the centres of 0 and 0', and the diagonals of the said rectangle intersect at the single centre of gravity of both oval systems which thus always lies halfway between the centre of gravity of ring E and the point B about which it revolves, however the length of the sides of the said rectangle may vary in the course of the revolution of G. Therefore eccentric ring E' duly weighted, (see Figure 5), the eccentricity of which varies as that of ring E as hereinbefore described, will always correctly counterbalance not only ring E but also the oval systems.

The movements of 0 and 0' are similar to the movements of two opposite cogs on a pinion rolling uniformly in mesh around an internal gear wheel of twice the diameter. The said cogs move on perpendicular straight lines—diameters of the said internal gear—with constant aggregate velocity and with no pulsating effect. Vibration of the bearings due to the revolving eccentric centre of gravity of a single pinion could be eliminated by providing a counter-weight with its centre opposite, as 0 and 0' are balanced by E'. Except that the common centre of gravity of 0 and 0', which corresponds to the centre of the said pinion, moves with the non-uniform motion of G the pulsating effect of the generally wide oscillations of these heavy members 0 and 0' and their connections including the clutch rings cancel or offset each other, and this is a distinguishing advantage of this mechanism. The much smaller pulsating effects due to the non-uniformity of velocity which are about four per cent of the above-mentioned oscillations on which they are superimposed, are readily eliminated by being absorbed in balance wheels,—the cylinder X' in the direction of the driving shaft and the twin balance-wheels Q' in the direction of the driven shaft. Comparatively light balance-wheels are ample since the changes in velocity are slight and, compared to the driving speed, slow.

From the foregoing descriptions of the several elements of my mechanism it will be seen that the variation of speed-ratio is effected mainly in the two-wheel "orbital" mechanism (Figure 2) whereby rotation of the driving shaft is immediately translated in the frame X to rotation of approximately the desired output speed. The effect of the "orbital" mechanism is thus very similar to that of an ordinary two-wheel reduction device operating at a fixed speed-ratio. Although most of the said duly reduced or augmented rotary motion is re-transferred directly into rotary motion in the driving shaft through the pivots *i* and *i'* (Figures 5 and 6), the angular velocity of which is always quite uniform although their radial motion is not, a small proportion, by which the speed-ratio is varied and controlled, is intermediately transferred into straight line movement. The relative amounts depend upon the relative motion between the end pivots of the links connecting the ovals to the clutching rings, that is, with the elements of the relative size shown in these drawings only one-fifth of the motion of G is transferred to straight line movement in *i* or *i'* because in any operative range the clutch ring pivot moves five times the distance in its circumferential path that the reciprocating pivot on the oval moves radially to or from the centre of the rings. It may be said that the radial movement of the latter pivot causes only one-fifth of the clutch ring rotation and its angular movement causes four-fifths. But this applies only to velocities; it is, in general, an understatement as to the division of power, because as the speed-ratio is increased from zero there is ever less force applied to the radial movement until at direct drive there is none and the always infrequent and slow oscillations are then merely idling movements and would cease at direct drive if the brake-band S' holding the eccentric bearing 12' were released.

The foregoing described an important distinguishing feature of my mechanism. In general, it can be said, whatever objections there may be to the employment of oscillating elements—and as far as present knowledge goes this is inevitable in all positive variable-speed transmissions—they are reduced to a minimum in this mechanism. Certain particular advantages resulting from the novel feature of rotating the paths of the oscillating elements about their point of intersection and of the same in conjunction with the above-mentioned orbital mechanism, will now be more definitely described.

One such advantage is that before a complete orbital revolution of the eccentric E takes place relative to the axial rotation of frame D, the eccentric must in general make several revolutions, and it follows that the eccentric will have a "soft" action on the clutching devices so that the full range of any one clutching device will be expended in a gradual manner, as the eccentric operating at a slightly greater rate continues gradualy to over-run the slower rotation of the frame D, and there will be no jerky or violent clutching impulses such as would be experienced if the oscillating clutching devices were simply mounted on a rigid frame and did not rotate in a thrust-relieving manner as defined.

Another unique advantage is that the relative movements of the motion-transmitting elements, slow at low speed-ratios, in my mechanism become still slower with increasing speed-ratios and at direct drive are eliminated completely, whereas in other known mechanisms the relative movements of the transmission elements increase with the speed-ratio.

Still another distinguishing advantage of the said "orbital" and "reduction" mechanisms is the complete range of speed-ratios thus made possible, as will now be explained.

According to the use for which it is intended, this machine may be adapted for any required maximum output speed relative to that of the driving shaft. For this purpose it is only necessary to select suitable relative sizes of gear wheels in the said "orbital" and "reduction" mechanisms. At direct drive, as frame X and eccentric ring E gain a quadrant over frame D, so does the output shaft; i. e. the clutch rings are rotated relatively a full quadrant in each operative range. But the maximum operative range of a clutch ring is about 120° or one and one-third quadrants relative to frame D, whilst the operative range of G is always a quadrant, and when the range of the clutch rings (according to the speed-ratio selected) is less than a quadrant the speed-ratio is less than unity or direct drive and when it is more than a quadrant the speed-ratio is greater than unity. The speed-ratio is not directly proportional, however, to the range of the clutch rings except when the relative size of external and internal gear wheels is the same in both the "orbital" and "reduction" mechanisms. But when the said relative size is less in the "reduction" than in the "orbital" mechanism the speed-ratio increases at an accelerating ratio to the range of the clutch-rings. For instance when the ratio of the diameters of the pitch circles of the "orbital" gear wheels 2 and 3 is 9 to 10 and that of the "reduction" gear wheels 12 and 13 is 4 to 5, approximately as in the drawings, the maximum speed-ratio is two; and if the said ratio of the "orbital" gears remains 9 to 10 and that of the "reduction" gears is changed to 3 to 5 the maximum output speed would be indefinitely increased, only limited by the strength of the elements in relation to the power to be transmitted. In this case the ratio of the speeds of axial rotation of inner and outer wheels of the "orbital" mechanism approaches the inverse ratio of the pitch diameters. An indefinite number of ratios can be found from the governing formula for any desired maximum output speed; e. g. another pair of ratios which will produce an indefinitely great output speed is 6 to 7 in the "orbital" mechanism and 3 to 7 in the "reduction" mechanism. However, where a very high speed-ratio is desired the arm 32 and the link 33, Figure 5, should be designed so that they may be moved into alignment, thus requiring finite relative movements of the said arm and link to effect the final indefinitely small stages in the eccentricity of E to produce the maximum output speed desired.

Gear 2, although it is shown in the drawings for clearness as a single member, should, in practice, be in duplicate with eccentric bearings on opposite sides of shaft A, to keep the centre of gravity of the revolving orbital mechanism at the axis of said shafts.

*To reverse.*—To reverse the direction of the output shaft relative to that of the driving shaft with the elements connected as shown the brake-band S which encircles the frame X and is secured to the frame 1 is tightened by any suitable means on frame X, holding it stationary, and the brake-band S', on the sleeve extension of eccentric 12', is released. Then, as the axis of the gear 2 is revolved by shaft A and eccentric 2', the gear 2 axially rotates backward at one-ninth the rate of shaft A (when the relative size of wheels 3 and 2 is nine to ten) causing output shaft B to rotate in reverse with it.

For many uses of the machine this reverse motion will meet the requirements, but in case variable-speed reverse motion is desired, the brake-band S' is released and shaft B is prevented from rotating by a suitable brake-band (not shown). The frame D will then rotate backwards and with it the sleeve extension of 12' which rotates with the axis of gear 12, the latter at a more rapid rate than the frame D, and both will rotate in reverse with a speed varying according to the eccentricity of E. In this case the said sleeve extension of 12' may be extended through the casing instead of ending as shown in Figure 1 just inside the casing, to make it available for the transmission of power.

The backward pressure on the axis of gear 12, viz. on the eccentric 12' gradually decreases as the speed-ratio increases up to direct drive, and beyond direct drive there is a forward pressure on it. Therefore if the sleeve extension of the eccentric 12' is provided with bearings between it and the eccentric 12', say at the point 12'', instead of being fixed to it as previously described in connection with Figure 1, and is also fitted with a one-way ball clutch device allowing free rotation forward, at direct drive (the said pressure then being zero) frame D will rotate with all the other elements about the central shaft B and there will be no relative motion in any of these elements. In this case direct drive is the maximum speed. Otherwise, frame D "idles" at direct drive.

The motion and power transmitting parts are all rotatably mounted on co-axial central shafts. For operative action one, and only one, such rotatable or revolvable part must be stopped or controlled by a connection with the casing (except at direct drive). To this end, for various purposes, any one of such co-axial wheels or frames may be prevented from rotation, or either of the wheels eccentrically mounted of the orbital or reduction mechanisms, may be prevented from orbital revolution. Also, the functions of the driving and driven shafts may be reversed.

The modifications described above are examples representative of many changes which may be employed to adapt the machine readily to numerous useful purposes and these serve to indicate the versatility and wide adaptability and scope of the present invention. I, therefore, do not limit myself to the exact structure shown, since this may be modified to a considerable extent without departing from the essential features of the invention.

What I claim as my invention is:

1. A variable speed and motion transmitting mechanism comprising in combination co-axial driving and driven shafts, an orbital mechanism connected with the driven shaft and operatively engaging said driving shaft, means for translating a part of the rotary motion from said orbital mechanism into straight line motion, a shaft co-axial with the aforesaid shafts, means included in said translating means for modifying uniform angular motion into regularly varying non-uniform angular motion of said co-axial shaft of the same average velocity to produce uniform straight line motion, said means also including consecutively acting straight-line motion devices, synchronizing means connecting said modifying means with said straight-line motion devices, a rotatable frame co-axial with said driven shaft displaceably supporting said straight-line motion devices, a reduction mechanism forming an operative connection between the driven shaft and said rotatable frame, intermittent clutch devices mounted on the driven shaft, means connecting said straight-line motion devices with said clutch devices for imparting uniform vibration-free movement to the driven shaft, eccentric means operatively interposed between said non-uniformly moving co-axial shaft and said straight-line motion devices, and means for varyng the eccentricity of said eccentric means while in motion to vary the movement of said straight-line motion devices and the speed of rotation of the driven shaft.

2. A mechanism as claimed in claim 1 in which the said orbital mechanism is arranged to transfer rotation between the driven shaft and a rotatably mounted co-axial frame through a gear ring connection rotatably mounted in part at least eccentrically of the driving shaft, the said frame having moving link connections with the said co-axial non-uniformly moving shafts, said gear connection being such as to transmit directly proportional velocities as referred to a line joining the common axis and the offset axis.

3. A mechanism as claimed in claim 1 in which the said orbital mechanism is arranged to transfer rotation between the driven shaft and a rotatably mounted co-axial frame through a gear ring connection rotatably mounted in part at least eccentrically of the driving shaft, the said frame having movable link connections with the said co-axial non-uniformly moving shafts, said gear connection being such as to transmit directly proportional velocities as referred to a line joining the common axis and the offset axis, said gear ring connection comprising a gear ring rotatably mounted eccentrically on said driving shaft, a member rigidly mounted on the driven shaft having a plurality of cranked coupling links pivotally connected with said gear, and an internal gear ring meshing with the said gear and supported co-axially by the said rotatable frame.

4. A mechanism as claimed in claim 1 in which arms fixed to and rotating uniformly with the driving shaft transmit the power to arms mounted on a co-axial shaft rotating non-uniformly at the same average speed by link connections arranged so that the power is transmitted from said uniformly moving arms to said non-uniformly moving arms substantially clear of other parts, a modifying mechanism being co-operatively associated with said link connections to displace the same to alternately increase and diminish the angular distance between said arms once for every consecutive operative range of the said straight-line motion devices to produce uniform motion in the same.

5. A mechanism as claimed in claim 1 in which arms fixed to and rotating uniformly with the driving shaft transmit the power to arms mounted on a co-axial shaft rotating non-uniformly at the same average speed by link connections arranged so that the power is transmitted from said uniformly moving arms to said non-uniformly moving arms substantially clear of other parts, a modifying mechanism being co-operatively associated with said link connections to displace the same to alternately increase and diminish the angular distance between said arms once for every consecutive operative range of the said straight-line motion devices to produce uniform motion in the same, said modifying mechanism comprising gear pinions with axes mounted on said uniformly rotating arms, said pinions meshing with a gear rigidly mounted concentrically of said driven shaft on a co-axial tubular extension of the supporting frame of the said straight line motion devices, said pinions and gear being so proportioned that said pinions rotate on their axes once relative to the said frame as they roll over a quadrant of the central gear meshing therewith, each pinion having a crank connected with a link operatively connected to a lever mounted on one of the said arms, said lever operating a link which is connected to an arm extension of said non-uniformly moving shaft.

6. A mechanism as claimed in claim 1 in which the said eccentric means comprises strap-rings rotatably mounted on an eccentric ring of variable eccentricity connected to revolve orbitally with the said non-uniformly moving co-axial shaft, said strap-rings being operatively connected to said straight-line motion devices.

7. A mechanism as claimed in claim 1 in which the said eccentric means comprises strap-rings rotatably mounted on an eccentric ring of variable eccentricity connected to revolve orbitally with the said non-uniformly moving co-axial shaft, said strap-rings being operatively connected to said straight-line motion devices, said straight-line motion devices comprising a pair of frames displaceably mounted in the said rotatable frame to oscillate relative thereto in perpendicular stright paths intersecting at the axis of said frame, each oscillating frame being operated by an operative connection with one of the said eccentric strap-rings and being operatively connected to two of the said clutch devices to impart uniform rotary motion through the said clutch devices to the driven shaft.

8. A mechanism as claimed in claim 1 in which the said eccentric means comprises strap-rings rotatably mounted on an eccentric ring of variable eccentricity connected to revolve orbitally with the said non-uniformly moving co-axial shaft, said strap-rings being operatively connected to said straight-line motion devices, said straight-line motion devices comprising a pair of frames displaceably mounted in the said rotatable frame to oscillate relative thereto in perpendicular straight paths intersecting at the axis of said frame, each oscillating frame being operated by an operative connection with one of the said eccentric strap-rings and being operatively connected to two of the said clutch devices to impart uniform rotary motion through the said clutch devices to the driven shaft, said oscillating frames being guided in straight paths by pivotal link connections with the said rotatable supporting frame, each said frame being pivotally connected at each end to the middle link of a striple chain of links, the outer ends of each chain of links being pivotally connected to the said rotatable frame, the middle link at one end of each floating frame being pivotally connected in offset relation to the other pivotal connection with one of the said eccentric strap-rings, the path of the latter pivotal connection being radial to the driven shaft and the said other pivotal connection being offset therefrom a distance predetermined to counteract the deviation from uniform motion in the said radially moving pivotal connection due to the varying obliquity of the line joining the centre of the eccentric and the said pivotal connection in angular relation to the corresponding line through the pivotal connection radial to the driven shaft.

9. A mechanism as claimed in claim 1 in which the said eccentric means comprises strap-rings rotatably mounted on an eccentric ring of variable eccentricity connected to revolve orbitally with the said non-uniformly moving coaxial shaft, said strap-rings being operatively connected to said straight-line motion devices, said straight-line motion devices comprising a pair of frames displaceably mounted in the said rotatable frame to oscillate relative thereto in perpendicular straight paths intersecting at the axis of said frame, each oscillating frame being operated by an operative connection with one of the said eccentric strap-rings and being operatively connected to two of the said clutch devices to impart uniform rotary motion through the said clutch devices to the driven shaft, said floating frames having offset pivotal connections with the links connecting them with the said intermittent clutch devices on the driven shaft, the offset distance of the paths of the said pivotal connections from the parallel radial lines in relation to the position and length of said links and the radial distance of their pivotal connections with the clutch arms being such as to maintain uniformity of velocity between the linear motion of the one pivotal connection and the angular motion of the other over a maximum angular range of the clutch arms substantially greater than the corresponding operative angular movement of the eccentric ring relative to the said supporting frame.

10. A mechanism as claimed in claim 1 in which the said reduction mechanism is arranged to transfer directly proportional rotation between the driven shaft and the said co-axial supporting frame and includes a gear ring connection rotatably mounted in part at least eccentrically of the driven shaft.

11. A mechanism as claimed in claim 1 in which the said reduction mechanism is arranged to transfer directly proportional rotation between the driven shaft and the said co-axial supporting frame, said reduction mechanism comprising a gear ring rotatably mounted on a stationary eccentric and meshing with an internal gear ring mounted concentrically on the said supporting frame, a plurality of radial arms secured to the driven shaft, and coupling links comprising a plurality of cranks connected with the ends of said radial arms and rotatably connected to said eccentrically mounted gear ring.

12. A mechanism as claimed in claim 1 in which said "orbital" mechanism and said "reduction" mechanism each includes a pair of relatively eccentric gear rings, the relative sizes of the two gear rings in the "reduction" mechanism being of predetermined selected ratio in relation to the sizes of the two gear rings in the "orbital" mechanism to permit the predetermined maximum output speed in accordance with the service requirement.

13. A mechanism as claimed in claim 1 in which the said reduction mechanism is arranged to transfer directly proportional rotation between the driven shaft and the said co-axial supporting frame, said reduction mechanism comprising a gear ring rotatably mounted on a stationary eccentric and meshing with an internal gear ring mounted concentrically on the said supporting frame, a plurality of radial arms secured to the driven shaft, and coupling links comprising a plurality of cranks connected with the ends of said radial arms and rotatably connected to said eccentrically mounted gear ring, said stationary eccentric being rotatably mounted on an axis concentric with the driven shaft, and selectively operable brake means cooperating with said latter eccentric and with said frame adapted to release said eccentric and hold said frame to effect reversal of the drive.

14. A mechanism as claimed in claim 1 in which the said reduction mechanism is arranged to transfer directly proportional rotation between the driven shaft and the said co-axial supporting frame, said reduction mechanism comprising a gear ring rotatably mounted on a stationary eccentric and meshing with an internal gear ring mounted concentrically on the said supporting frame, a plurality of radial arms secured to the driven shaft, and coupling links comprising a plurality of cranks connected with the ends of said radial arms and rotatably connected to said eccentrically mounted gear ring, the stationary eccentric being rotatably mounted on a sleeve extension and provided with one-way clutch devices allowing it free forward rotation with the output shaft when the back pressure on it ceases at direct drive.

15. A mechanism as claimed in claim 1 in which the means for varying the speed-ratio between the driving and driven shafts comprises a steep thread on the said non-uniformly moving co-axial shaft, a pair of tubes with means for preventing relative rotation, one of them provided with an arm with pivotal link connection with the eccentric ring connected with said shaft, and the other tube provided with a nut seated upon the said thread, said tube being axially movable back and forth to effect a degree of relative angular movement of said arm relative to said eccentric ring by which its eccentricity is varied, the former tube being rotatably mounted under an encircling threaded tube axially movable with the said former tube, means to prevent the threaded tube from rotating, a nut seated upon said thread, and means to turn said nut to cause axial movement in said threaded tube and relative rotation in the tube with said arm.

16. A mechanism as claimed in claim 1 in which the said means for varying the speed-ratio between driving and driven shafts comprises a pair of co-axial elements, one fixed to and concentric with the said non-uniformly moving co-axial shaft and the other journalled upon it, means including an independent control member to move the said co-axial elements relatively while they are in motion, said eccentric means including a floating ring, a crank on the latter co-axial element, and a link pivotally connecting said crank and the floating ring which revolves with the said shaft, said link being so placed as to alter the eccentricity of said floating ring on the relative movement of the said co-axial elements.

17. A mechanism as claimed in claim 1 in which the said means for varying the speed-ratio between driving and driven shafts comprises a pair of co-axial elements, one fixed to and concentric with the said non-uniformly moving co-axial shaft and the other journalled upon it, means including an independent control member to move the said co-axial elements relatively while they are in motion, said eccentric means including a floating ring, a crank on the latter co-axial element and a link pivotally connecting said crank and the floating ring which revolves with the said shaft, said link being so placed as to alter the eccentricity of said floating ring on the relative movement of the said co-axial elements, the said means to move relatively the two co-axial elements comprising separate intermediate elements operatively connected to said co-axial elements respectively, said intermediate elements being operatively connected through a terminal element, whereby motion is transferred through the said train of elements from the driving element to the driven element of the first-mentioned pair of elements, means whereby reactions of the elements of said train are against a fixed fulcrum other than the bearings of the said first pair of elements and against a fulcrum movable with and against the force of the said reaction by the control member, to effect the required relative movement of said first pair of elements, the ratios of velocities between the said operatively connected elements being such as to maintain equal velocity in the said first pair of elements only while the said control member is stationary, means being included to move said control member.

18. A mechanism as claimed in claim 1 in which means for varying the eccentricity of said eccentric means to control the speed-ratio between driving and driven shafts comprises two pairs of co-axial gear wheels, one wheel of the first pair being fixed to and concentric with said non-uniformly moving co-axial shaft and the second pair fixed to rotate together, each wheel of the first pair being connected to a corresponding wheel of the second pair by an intermediate wheel meshing with both, means to revolve one gear wheel axis about another axis as centre with the wheels in constant mesh, means for supporting said other axis in fixed position, the relative sizes of the wheels being such that the two wheels of the first pair move relatively to each other only when the movable axis is in motion, a crank on that wheel of the first pair which is rotatably mounted on the non-uniformly moving co-axial shaft, a link pivotally connecting said crank with the eccentric ring which revolves with the said shaft, said link being so placed as to alter the eccentricity of the said eccentric ring by the relative movement of the wheels of the said first pair, and means for moving the said movable axis.

19. A mechanism as claimed in claim 1 in which the driving shaft is rotatably supported in a bearing in one end of a fixed casing and the driven shaft is journalled in a bearing in the opposite end of said casing and extends across the casing and has an end journalled in a bearing in the driving shaft, a frame supporting the modifying mechanism being journalled concentrically on the driven shaft, the rotatable supporting frame for the straight-line motion devices having a tubular shaft connection with said modifying mechanism, said shaft connection being journalled concentrically of the driving shaft, the non-uniformly moving shaft connecting the modifying mechanism with the eccentric mechanism being journalled concentrically of said tubular shaft connection and having arms extending therefrom connected with arms rigid with and extending from eccentrically mounted members.

20. A mechanism as claimed in claim 1 in which a unit rotatably mounted on an axis offset from the driven shaft is prevented from orbital revolution and all other motion transmitting parts revolve about the shaft axis.

21. A mechanism as claimed in claim 1 in which a unit co-axial with the driven shaft is prevented from rotating and all other motion transmitting parts revolve about the shaft axis.

22. A mechanism as claimed in claim 1 in which said "orbital" mechanism and said "reduction" mechanism each includes a pair of relatively eccentric gear rings, the relative sizes of smaller to larger gear ring in the "reduction" mechanism being in a smaller ratio than in the gear rings of the "orbital" mechanism if and when the ratio of maximum output speed to direct drive is required to be greater than the ratio of the maximum operative ranges of the clutch rings to the eccentric ring relative to the said supporting frame.

FRANK BARBER.